UNITED STATES PATENT OFFICE.

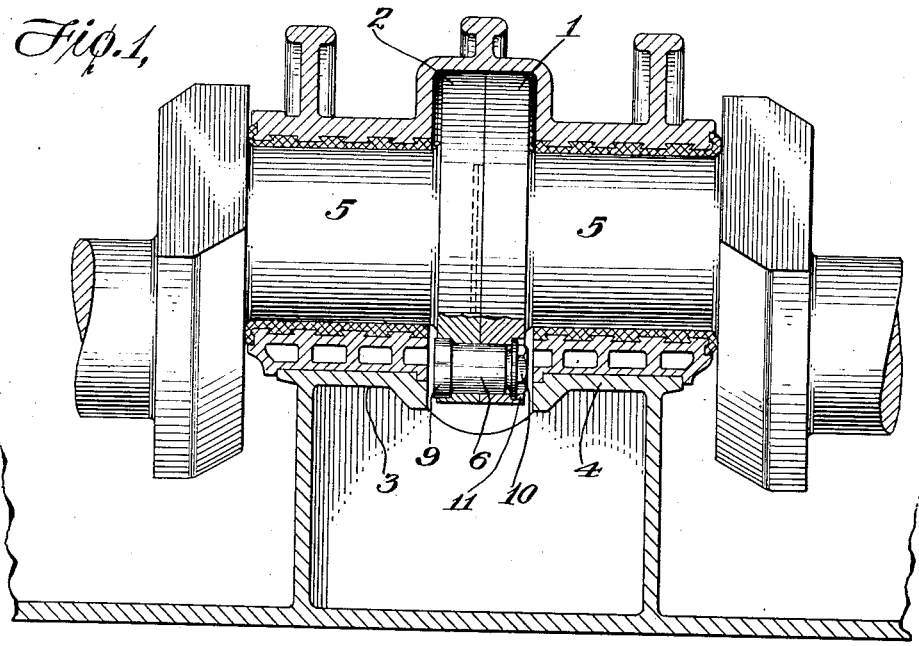

PAUL HENTSCHKE, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

MARINE-ENGINE CRANK-SHAFT.

1,245,587.      Specification of Letters Patent.      Patented Nov. 6, 1917.

Application filed February 14, 1917. Serial No. 148,665.

*To all whom it may concern:*

Be it known that PAUL HENTSCHKE, a citizen of Germany, residing in St. Louis, Missouri, has invented the following-described Improvements in Marine-Engine Crank-Shafts.

The improvements relate to the crank shafts of multiple cylinder internal combustion engines used for propelling boats and submarines, in which vessels it is desirable that the shaft be made in two or more sections so as to be removable through the relatively narrow hatches of the vessel. In multi-cylinder engines the crank shaft in its entirety is of considerable length, being always as long as the row of combustion cylinders which drive it, and the joint or joints between sections occur in one or more of the spaces between adjacent cylinders which are on that account widened relatively to the other inter-cylinder spaces. It is the object of the present invention to provide a joint coupling for the shaft sections which affords the requisite strength with a minimum longitudinal dimension so that the inter-cylinder space need be widened very little, if at all, and the over-all length of the engine is thus kept to a desired minimum. To this end the present invention consists in the arrangement of the crank shaft flanges and the shear and strain-resisting elements thereof and their general relation to the crank shaft bearing all as herein below explained and claimed.

In the drawings:

Figure 1 illustrates the proximate ends of two sections of a marine crank shaft for multi-cylinder, internal combustion engines and the journal bearing therefor at the joint;

Fig. 2 is an enlarged axial section of one of the series of connectors which unite the said flanges; and Fig. 3 is an end view of Fig. 2.

The coupling is formed by two flanges, 1 and 2, forged or formed on the contiguous ends of the two crank shaft sections, of equal circular diameter and each of adequate thickness to resist the torsion and deflection strains to which the particular shaft is liable. These flanges occupy the central cavity of a divided journal bearing comprised of two bearing sections 3 and 4 supported on the engine bed and the said flanges are of no greater width, measured radially from the adjacent journal 5 of the crank shaft, than will suffice to accommodate the holes for the several connectors which secure the flanges together.

The said connectors are each composed of shear-resisting and tension-resisting elements, the former being adapted to carry the relatively rotary or shearing stresses of the two flanges and the latter being adapted to prevent separation of the flanges and also to retain the shear-resisting element in position. According to this invention the shear-resisting element is of larger diameter and occupies the full diameter of the flange holes at the plane of the junction, the said holes being understood to be as large as the flange dimensions have been designed to accommodate, while the strain-resisting element is of less effective diameter although of adequte tensile strength and this element has a head for coöperation with a head on the other element whereby it is able to resist separation of the flanges.

In the illustrated form of the invention the shear-resisting member is represented by the cylindrical part of the tubular member 6 which intersects the plane of the junction between flanges and such cylindrical part extends well to either side of the said plane as indicated whereby the shearing stresses are taken by the relatively extended flange surfaces marked 7. The tension element is represented by the headed bolt member 8 which is threaded to the female threads of the tubular member 6 and acts through the latter and through its head 9 to form the tension connection. The head 10 of the tension or bolt member 8 and the head 9 of the tubular shear or nut member 6 are of substantially equal diameter and both occupy countersunk recesses 11 and 12 in their respective shaft flanges 1 and 2. The entire shaft coupling is thus confined to the longitudinal dimension of the two flanges. The bolt member 8 extends through the head 9 where it is cross perforated to reecive a linch-pin 13, the ends of which occupy one of the dished grooves in the concaved head 9. It is obviously desirable that the threaded engagement between the bolt and nut members be extended sufficiently to intersect the plane of the junction between flanges, inasmuch as thereby a certain reinforcement is afforded to the shear-resisting element, and the extension of the bolt member entirely through the nut member also forms a convenient means of locking the two together as by the linch-pin shown. It will be observed that the tubular member 6 is the widest member of the two-part connector and opposes its greater width and extent of surface to the shearing strains, while the narrower member 8 is compactly disposed and, although within the other member, possesses adequate cross-sectional area to support all the strain it is subject to, such strain being tensional in any event.

While I have shown the invention in its preferred form, it will be understood that various proportions and relative arrangement of the shear and tension element may be resorted to without departing from the principle of the invention which has now been explained.

Claims:

1. A crank shaft for multi-cylinder marine combustion engines comprising in combination with a divided crank shaft journal bearing, a crank shaft coupling having contiguous flanges occupying the cavity between sections of said divided bearing and a series of connectors occupying registering holes in said flanges and each comprising a headed shear-resisting member in one of said holes, of relatively wide diameter, and a tension-resisting member of smaller diameter threaded to said first mentioned member.

2. A crank shaft for multi-cylinder marine combustion engines comprising a crank shaft coupling having contiguous flanges and a series of connectors occupying registering holes in said flanges and each comprising a headed tubular shear-resisting member of relatively wide diameter, and a headed tension-resisting member of relatively smaller diameter and screwed into the first mentioned member, the heads of both members occupying countersunk recesses in their respective flanges.

In testimony whereof, I have signed this specification.

PAUL HENTSCHKE.